United States Patent
Gefen et al.

(10) Patent No.: US 11,954,941 B2
(45) Date of Patent: Apr. 9, 2024

(54) FACIAL RECOGNITION IOT APPLICATION FOR MULTI-STREAM VIDEO USING FORECASTING TOOLS

(71) Applicant: EMC IP Holding Company LLC, Hopkinton, MA (US)

(72) Inventors: Avitan Gefen, Tel Aviv (IL); Amihai Savir, Sansana (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 86 days.

(21) Appl. No.: 16/742,464

(22) Filed: Jan. 14, 2020

(65) Prior Publication Data

US 2021/0216753 A1 Jul. 15, 2021

(51) Int. Cl.
| | |
|---|---|
| G06V 40/16 | (2022.01) |
| G06F 16/55 | (2019.01) |
| G06F 17/18 | (2006.01) |
| G06V 20/40 | (2022.01) |

(52) U.S. Cl.
CPC .......... *G06V 40/172* (2022.01); *G06F 16/55* (2019.01); *G06F 17/18* (2013.01); *G06V 20/49* (2022.01)

(58) Field of Classification Search
None
See application file for complete search history.

(56) References Cited

U.S. PATENT DOCUMENTS

| | | | |
|---|---|---|---|
| 11,010,599 B2 | 5/2021 | Gefen et al. | |
| 11,334,746 B2 | 5/2022 | Gefen et al. | |
| 2010/0157064 A1* | 6/2010 | Cheng | G08B 13/19645 348/169 |
| 2015/0117786 A1* | 4/2015 | James | G06V 40/161 382/195 |
| 2015/0208015 A1* | 7/2015 | Takahashi | H04N 21/4316 348/159 |
| 2015/0294140 A1* | 10/2015 | Miyano | G06V 40/23 382/103 |
| 2020/0065548 A1* | 2/2020 | Hwang | G06F 11/3072 |
| 2020/0202511 A1* | 6/2020 | Robertson | G06N 20/00 |
| 2020/0401791 A1* | 12/2020 | Gao | G06V 10/768 |
| 2021/0150217 A1* | 5/2021 | Kansara | G06V 10/762 |
| 2022/0067758 A1* | 3/2022 | Ono | G06Q 30/0202 |

OTHER PUBLICATIONS

Bolme et al., "Visual Object Tracking Using Adaptive Correlation Filters", Computer Science Department, Colorado State University, 2010, The IEEE Conference on Computer Vision and Pattern Recognition (CVPR), pp. 1-10.

* cited by examiner

*Primary Examiner* — Santiago Garcia
(74) *Attorney, Agent, or Firm* — Workman Nydegger

(57) ABSTRACT

One example method includes accessing an appearance history of a person, the appearance history including information concerning an appearance of a person at a particular time, generating, based on the appearance history, a forecast that comprises a probability that the person will appear again at some future point in time, determining that the probability meets or exceeds a threshold, and updating a high probability group database to include a facial image of a face of the person.

18 Claims, 5 Drawing Sheets

FACIAL RECOGNITION IOT APPLICATION FOR MULTI-STREAM VIDEO USING FORECASTING TOOLS

FIELD OF THE INVENTION

Embodiments of the present invention generally relate to facial recognition in a multi-stream environment. More particularly, at least some embodiments of the invention relate to systems, hardware, software, computer-readable media, and methods for real time facial recognition and related analyses in edge, and near-edge, computing environments.

BACKGROUND

Facial recognition technologies may produce acceptable results when deployed in some circumstances, such as when there is a need to recognize faces offline in a cloud computing environment. However, performing facial recognition in other environments may be difficult, at best.

For example, an attempt to implement facial recognition processes in an edge computing environment would present a significant challenge in that edge computing devices typically lack the computational power that would be needed to perform the data gathering and analysis that would be needed. To illustrate, if a large database of faces is employed in facial recognition processes, it may be highly time-consuming to go through the entire database for each frame of gathered data. As such, facial recognition processes may proceed too slowly to be useful.

A related concern is that because edge devices, and near-edge devices, are at the outer periphery of a cloud environment, such devices would suffer from problems such as connectivity latency with the cloud. Again, such a result may be unacceptable in some circumstances, as excessive latency may significantly slow data gathering and analysis.

A further problem that may be encountered is that of unseen angles. That is, a database of faces may stores vectors of faces that were generated from images of faces at some specific angle. In some instances, the face images may have been captured at some unseen angle and, consequently, there may be a low recognition rate for such face images.

Finally, problems such as those noted may be further aggravated in circumstances where there was a need for real time, or near real time, facial recognition. That is, real time data gathering and analysis may be difficult, if not impossible, in environments such as those just noted since problems such as latency and constrained computing resources would only be made worse when real time processes are needed.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
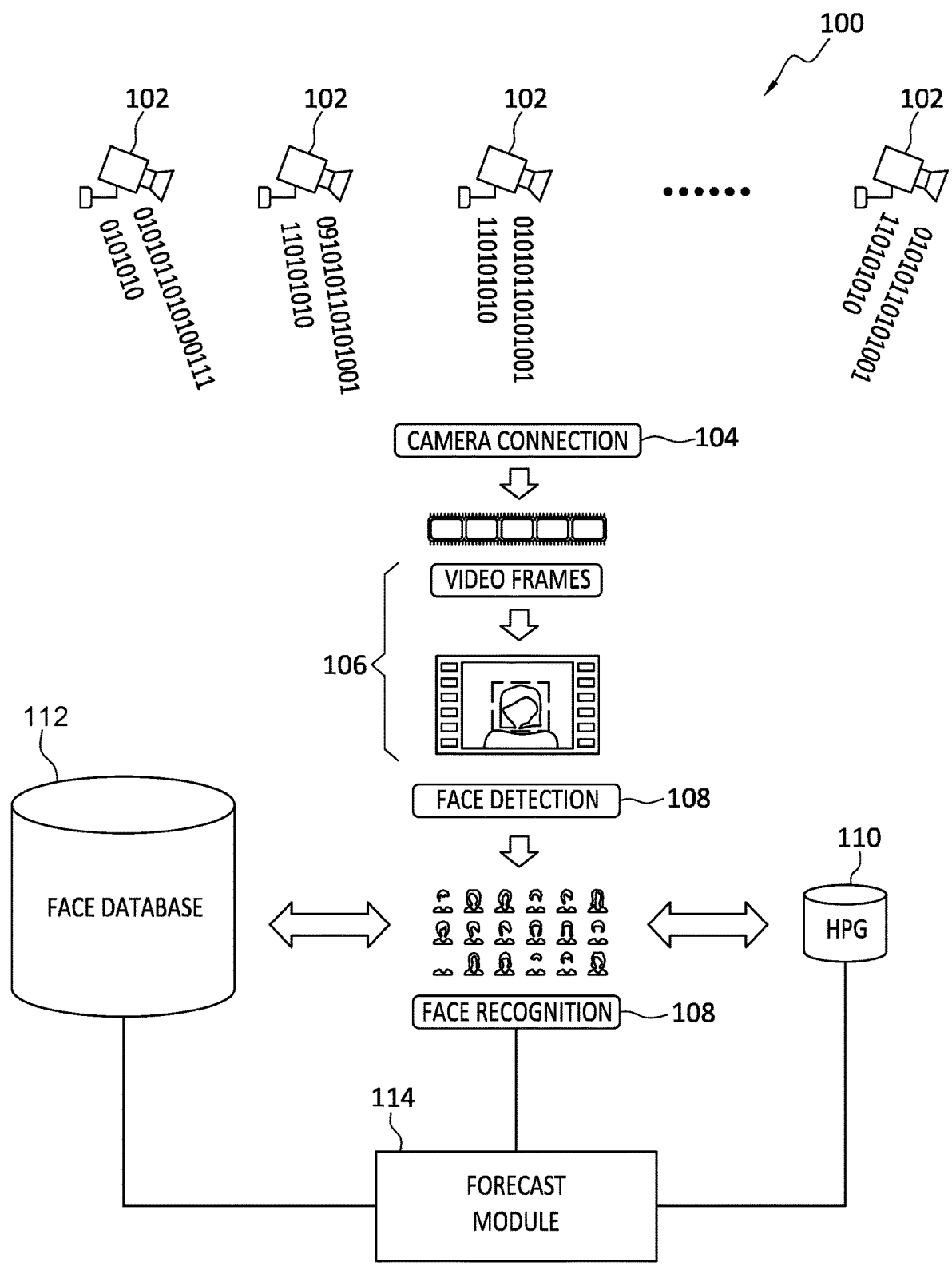
FIG. 1 discloses aspects of an example environment and architecture for some embodiments.

Embodiments of the present invention generally relate to facial recognition in a multi-stream environment. More particularly, at least some embodiments of the invention relate to systems, hardware, software, computer-readable media, and methods for real time facial recognition and related analyses in edge, and near-edge, computing environments. Some particular embodiments may be employed in environments where one or more cameras capture respective video streams that are to be analyzed. Such video streams may, or may not, also include corresponding audio information such as voices and other sounds for example. One example environment may be a business or other commercial environment where cameras are used to observe and record the faces and behavior of persons at the business site so as to distinguish between authorized visitors such as employees, and unauthorized visitors. The foregoing examples are provided only by way of illustration and are not intended to limit the scope of the invention in any way.

By way of brief overview, facial recognition systems may be used to identify or verify a person identity from an image/video by comparing facial features with faces within a database. This technology may be of particular interest in applications such as security, entertainment, and archival tagging, for example. Deep learning techniques in face detection may help to facilitate recognition of a very large number of people, such as by mapping faces from images into high dimensional Euclidean space. Each face may be transformed into a feature vector which allow similarity comparison by calculating its distance from other faces acquired beforehand. This database of faces can be very large. Moreover, the database may include one or more faces that appear only rarely, or only once. For example, a database of an airport may include the face of a traveler who is at the airport only infrequently. Such faces may be excluded from consideration and analysis in some cases.

Thus, in embodiments of the invention, a high probability group (HPG) approach may be employed that involves generating, saving, and analyzing, a set of facial images of persons who, based on historical and/or other data, are forecast to likely appear in a video at one or more future relevant times. On the other hand, images of the face of the hypothetical airport traveler may be initially collected for a database, but not included in the HPG, which may be a subset of a larger facial imagery database of the airport. This is because there may be no/little basis for expecting that particular traveler to appear on a regular basis, or again, either at the same time as before or at any other particular time.

At least some embodiments of the invention involve an HPG including, or otherwise associated with, a forecasting procedure that helps predict which faces are likely to appear in the near future based on the appearance history of one or more individuals. This procedure may help to identify faces that are relatively more relevant to a particular query, or criteria. The HPG may then be augmented with the faces predicted as likely to appear in the near future. Example embodiments of the invention may be agnostic to the particular face detection algorithm being employed, and the basic recognition algorithm may complement each such algorithms used now or in the future.

Examples of an HPG in accordance with some embodiments of the invention may embody, and/or otherwise take into account, in their structure, function, and operation, a variety of considerations. For example, a video is a sequence of image frames where each frame is usually close to those that came before. For this reason, there may be a good chance that each face in one or more new frames has already appeared in previous, that is, older, images. As another example, respective multi-stream videos may come from a group that includes cameras that are geographically close to each other, such as on the same office, floor, building, or campus, for example. Thus, persons, such as employees for example, who appear on one camera may be likely to appear on one or more of the other cameras as well. Another consideration that may be embodied in one or more example embodiments is that different cameras produce respective face images from different angles. Thus, the collection of face images from a variety of different angles may result in better image construction and recognition. Still another consideration is that people such as friends and co-workers often travel in small groups. These small groups may appear many times during a day/week/month. Thus, the appearance of one individual may permit an inference to be drawn that one or more persons of one or more related groups may be close by. A further consideration is that some persons may be treated by embodiments of the invention as being related to each other in some way, even if those persons are not all traveling in a small group, such as a mailman/delivery worker and the office manager who receives deliveries from the mailman/delivery worker. As another example of this consideration, people may be treated as related to each other who have regular meetings but may not typically be found together outside of those meetings. In this case, again, the appearance of one person in a particular place and/or at a particular time may suggest that a related person or persons is close by, will be close by in the near future, or was recently close by. At least some of the foregoing considerations thus reflect the notion that people often have one or more habits that involve performing the same/similar actions at the same/about the same time of day on multiple occasions.

In general, an HPG according to at least some embodiments is shared by a group of datastreams, and may be employed as follows for each new image frame that is checked. If the image belong to an already tracked face the image may be assigned to that face, and note that tracking may be implemented on an individual stream basis. If the image belongs to a face that is not being tracked, the image may be checked against the faces already found in the HPG and, if the image is close enough to a tracked face, the image is then assigned to that face and tracking of further similar or identical images may begin. On the other hand, if the image is not close enough to any of the tracked faces found in the HPG, a new face id may be generated for that image, and tracking of the new face may begin. As well, the new face id may be added to the HPG.

Thus, error rates in identifying and classifying an image of a face may be reduced by collecting images of the same person from all the video appearances of that person so as to have more examples of the face of that person. As well, when there are enough images of a new face id in the HPG, an attempt may be made to match the corresponding face to the large database of known faces to obtain the name, or other information, of that person. For example, such other information may be status information, such as whether or not an image captured by a company security camera is the face of a company employee. This matching operation may be conducted in parallel to face detection and HPG matching. For example, if a face was matched, any related persons may be imported to the HPG using the face-network.

Finally, if the HPG should become too large, one or more faces may be removed from the HPG according to various criteria. For example, if a particular face has not appeared for a particular period, or amount, of time, that face may be removed from the HPG. Even if the face were removed from the HPG, that face may still be 'remembered' by recording and retaining the timestamp of the last appearance of that face. Embodiments of the invention may provide for optimizing, for one or more particular times of a day, or days, a history window from which the HPG will be composed. This may be done, for example, by learning for each time of day, such as particular hours, or particular times such as morning and noon, what is the best window, denoted by time stamp, to use in a particular set of circumstances.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that facial recognition processes may be performed with an HPG, which may be significantly smaller in size than a full dataset of all faces, with the result that embodiments may be employed in edge computing environments by one or more edge computing devices that lack robust processing capabilities. An embodiment of the invention may reduce or eliminate latency problems by operating on a reduced size dataset in an edge computing environment. A reduced size dataset, such as an HPG for example, may enable queries of the dataset to be performed on a local cloud, or even at an edge device. An embodiment of the invention may perform any of the disclosed face recognition functionalities in real time, which enables such functionalities to be effectively implemented in dynamic environments that may change quickly over time. An embodiment of the invention may process data from multiple sources, each of which may capture data, such as concerning a face, from different respective angles. In this way, a more comprehensive data set may be obtained for analysis than would be possible with a lesser number of, or only one, data sources.

A. Aspects of an Example Architecture and Environment

The following is a discussion of aspects of example operating environments for various embodiments of the invention. This discussion is not intended to limit the scope of the invention, or the applicability of the embodiments, in any way.

Embodiments of the invention may be employed in any environment that comprises one or more devices for collecting unique information about one or more persons, such as facial images and/or portions of facial images, for example. New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

At least some embodiments may be employed in a environments that comprise, or consist of, a cloud computing environment with which one or more edge devices may communicate. Such edge devices may serve as access points to the cloud computing environment and may transmit data to, and/or receive data from, the cloud computing environment. In some embodiments, one or more edge devices may comprise data collectors such as video cameras for example. These edge devices and/or other edge devices may process some or all of the collected data. In some embodiments, the video cameras are not edge devices but communicate with edge devices.

The data collected by video cameras and/or edge devices may be stored in any of a variety of storage environments. Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

Devices in the operating environment may take the form of software, physical machines, or virtual machines (VM), or any combination of these, though no particular device implementation or configuration is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

With particular attention now to FIG. 1, one example of an operating environment for embodiments of the invention is denoted generally at 100. In general, the operating environment 100 may include one or more data collection devices 102, examples of which include, but are not limited to, cameras operable to capture still images, and video cameras. The data collection devices 102 may be individually operable and controllable and/or may be operable and controllable as a group. The data collection devices 102 may all operate at the same time, in overlapping timeframes, and/or abutting timeframes. Each of a group of data collection devices 102 may have a different respective visual perspective of a particular physical area through which one or more people, whose facial images are to be captured, may travel. Each of the data collection devices 102 may capture a respective stream of still images and/or video. In some embodiments, one or more of the data collection devices 102 may process part or all of the collected stream. Some embodiments of the data collection devices 102 may operate autonomously or semi-autonomously. For example, a data collection device 102 may include a motion sensor, an audio sensor, and/or a heat sensor, that may detect the presence of a user entering, passing through, and/or remaining in, one or more areas monitored by the data collection device 102. Such detection by one or more sensors may trigger data collection by that data collection device 102. Data collection by the data collection device 102 may cease when the presence of a person, or persons, is no longer detected in the monitored area. There may be a time delay between the time when the presence of the person is no longer detected and the time when data collection ceases.

It was noted above that in some embodiments, the data collection device 102 may be implemented as an edge device. As used herein, 'edge device' embraces, but is not limited to, a device that may serve, among other things, as an entry point to a network and/or other system, such as a datacenter or other cloud computing environment, that may be external to the device. An edge device may receive data from, and/or communicate data to, the network and one or more constituent elements of the network. An edge device may undertake processing and/or other workloads that might otherwise be handled by the network. Example edge devices include, but are not limited to, any device, which may or may not be portable, that is capable of communication with a network and/or other system. Thus, an edge device may comprise, for example, a video camera, a mobile phone such as a cellular phone or satellite phone, a laptop computer, a tablet, a global positioning system (GPS)-enabled device, radios such as 2-way radios, and any Internet of Things (IoT) device. Any edge device may include a power source, such as one or more batteries which may or may not be rechargeable, solar cells, or any other power source of limited capacity which must be replenished or replaced when the power of the power source has been exhausted. Other edge devices may be connected to a power source separate from the device itself. As well, any edge device may include one or more applications and/or other elements, which may comprise hardware and/or software.

With continued reference now to FIG. 1, the edge devices 102 may stream video data to a respective computer which may be onboard the edge device 102, or may be a separated cloud or edge device. The computer may comprise, or consist of, a dedicated camera connector 104 which may serve as a gateway by way of which the edge devices 102 communicate with other devices and systems and/or which may generate image frames 106, from one or more of the edge device 102 video streams, for further processing. The frames 106 may be fed to one or more face detection and tracking algorithms, which may be implemented as a face detection and tracking module 108 for example, that may operate to detect one or more regions of interest (ROI) of an image in one or more of the frame(s) 106. Any suitable face detection and tracking algorithm may be employed. Examples of such face detection and tracking algorithms that may be employed in some embodiments of the invention include, but are not limited to, Python, Raspberry Pi, and OpenCV.

Details concerning some example visual object tracking processes are disclosed in 'Visual Object Tracking using Adaptive Correlation Filters,' by Bolme et al., Computer Science Department, Colorado State University, Fort Collins CO 80521 ('Bolme et al.'). Bolme et al. is attached hereto as Appendix A, and is incorporated herein in its entirety by this reference.

As further indicated in FIG. 1, a face detected by the face detection and tracking module 108 may be matched to a face in an HPG 110 and, if the identity of the face is not known, a new face id is generated for the face. In this example, a face in the HPG 110 which is not recognized by name may be matched to a database 112 of faces so that the face in the HPG 110 may be identified, and the HPG 110 updated to indicate the identity of the face. The faces in the HPG 110 may be a subset of the faces in the database 112. Thus, embodiments of the invention may serve, among other things, to limit, or minimize, the number of times that a match must be run against the database 112 of faces by augmenting the relatively smaller HPG 110 set with relevant faces that may not have appeared yet, and then comparing faces against the HPG 110 rather than the database 112. The database 112 may be referred to herein as a database of known faces (DKF).

Finally, the example operating environment of FIG. 1 may comprise a forecast module 114 which may be implemented as a stand-alone component, or as part of the face detection and recognition module 108. However, no particular configuration of the forecast module 114 is required. The forecast module 114 may receive data from, and/or transmit data to, any one or more of the database 112, HPG 110, and the face detection and recognition module 108. In general, embodiments of the forecast module 114 may comprise, or consist of, a forecasting algorithm that implements a procedure which predicts which faces are likely to appear in the near future based on the appearance history of one or more individuals, where part or all of such appearance history may reside in any one or more of the database 112, the HPG 110, and/or, the edge devices 102. This procedure may help to identify faces that are relatively more relevant to a particular query, or criteria. The HPG 110 may then be augmented with the faces predicted by the prediction module 114 as likely to appear in the near future.

B. Aspects of Some Example Decision Flows

Figure 2:
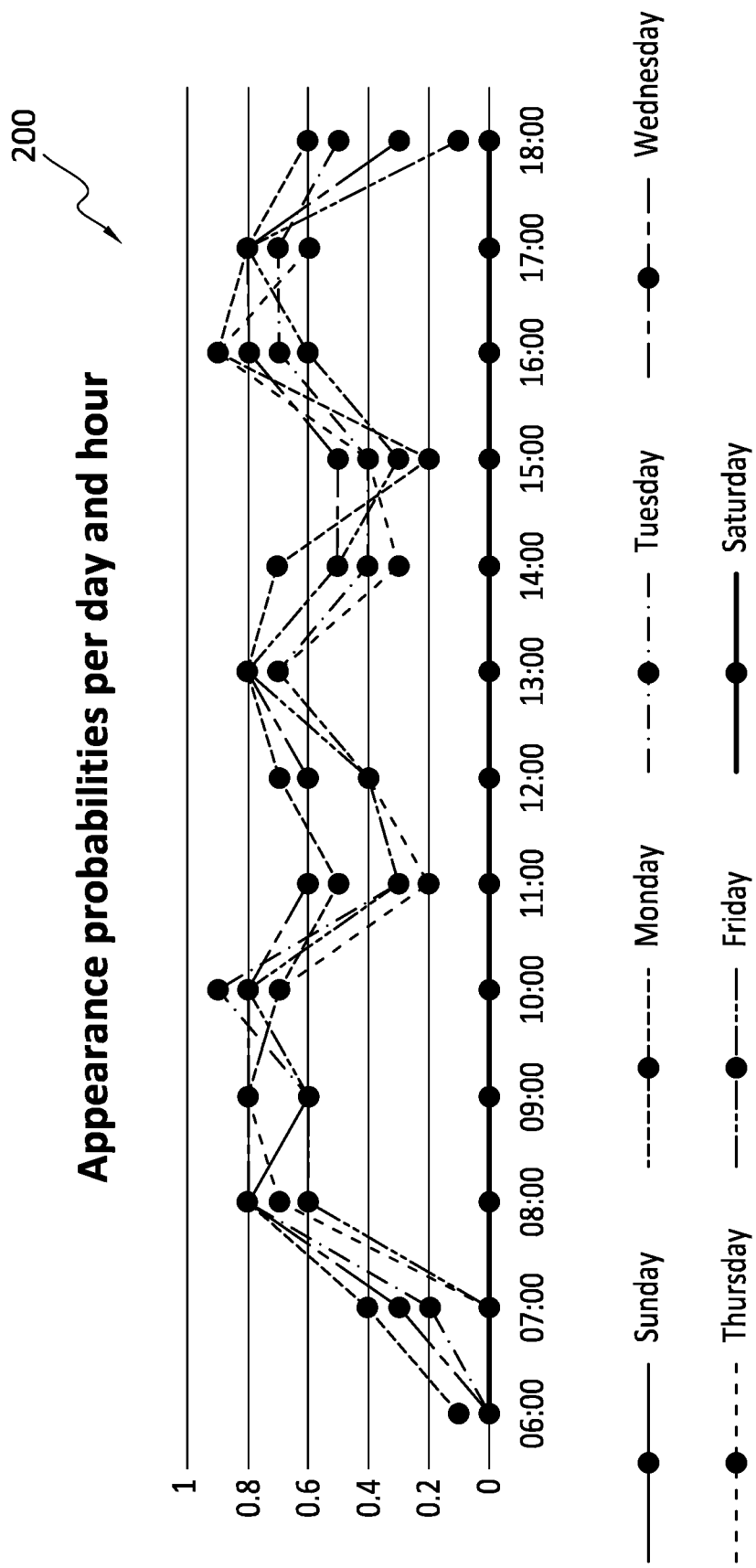
FIG. 2 discloses aspects of an example forecasting method.

With continued attention to FIG. 1, and directing attention now to FIG. 2 as well, aspects of example decision flows for each new video frame 106 are disclosed. Initially, a forecast mechanism, examples of which are disclosed elsewhere herein, may predict which individuals are more likely to appear in the next part of a day. If the faces corresponding to those individuals are not already in the 110, the facial images may be imported into the HPG 110. For example, in the example probability graph 200 of FIG. 2, it can be seen that a particular individual is very likely to appear between 09:00-11:00 on Tuesday. As also shown in the probability graph 200, the appearance probability that a given individual will appear at a particular place, at a particular time, may vary from one day of the week to another or, more generally, from one timeframe to another. As well, and with reference to the same 11:00 timeframe, the probability that a particular person will appear at a particular place at that time may vary from one day of the week to another. Thus, it is more probable that the person will appear in a particular location at 11:00 am on Wednesday than at the same time on Thursday. Various other relations will be apparent from the probability graph 200, and the foregoing are provided only by way of illustration.

If the image from a particular video frame 106 belongs to an already tracked face, the image may be assigned to that face. On the other hand, if the image from the video frame 106 does not correspond to a tracked face, the image may be checked against the faces already found in the HPG 110 and, if the image is close enough to a face in the HPG 110, then the image may be assigned to that face and tracking of that image may begin. If the image is not close enough to any of the faces found in the HPG 110, a new face id may be generated for that image, and tracking of the image may begin. As well, the new face id may be added to the HPG 110.

In general, embodiments of the invention may operate to collect images of the same person from all their video appearances and, in this way, reduce error rates by having more images, or examples, of the face of that person. When there are enough images of a face corresponding to a new face id in the HPG 110, an attempt may then be made to try to match the person to the large database 112 of known faces to get information such as, but not limited to, their name, and/or their status as an employee/not an employee. This operation of attempted matching may be conducted in parallel with face detection and HPG 110 matching.

C. Aspects of Example Forecast Generation

Embodiments of the invention may use the HPG 110 to consistently learn, or unlearn, so as to improve the accuracy and reliability of the data in the HPG 110. Thus, for example, each face on in HPG 110 may have one or more associated timestamps, which may be assigned by an edge device 102 or camera connector 104, that each correspond to a particular date and time that the face appeared in a video frame 106. These timestamps may be used to learn the probabilities, for example, that one or more specific individuals will appear at a particular time on a particular day.

To illustrate, a time period such as a day may be divided into segments such as, for example, morning/noon/afternoon. Following is an illustrative example.

m=number of day segments
ds=day segment, 1 ds m
n(d)=number of time series per day of week, analyzed for user
$f_{ds}$={1—person appeared, 0—person did not appear, the time series of appearances records if a person appeared, or did not, on some day segment $t_{d,i}=(a1, a2, \ldots, a_m)$, time series i of appearances during day of week d $S_{d,ds}=\Sigma i \leq n(d) \, t_{d,i} \, (ds)$, the sum of appearances of an individual on during a day segment on some week day The probability will be:

$p(x|d, ds)=S_{d,ds}/n(d)$, the probability that an individual will appear during a day segment on some week day Each day, a new time series may be collected, and probabilities may be calculated for each known individual. In real time, before the day segment is changing, for example moving from morning to noon, or other granularity, the HPG 110 may be updated for the next segment by adding all the individuals whose probability of appearance is higher than some established threshold.

As noted herein, the HPG 110 should remain small enough to be effective. To this end, performance experiments may be run to find optimal threshold sizes for the HPG 110. In some example embodiments, the experiments may be run using a random grid search to optimize runtime, although other approaches may alternatively be employed.

To briefly summarize a few points, example embodiments of the invention may be advantageous in that they provide for improved scalability of face recognition in multi-stream videos. For example, example embodiments may provide for faster identification of one or more persons by reducing, substantially in some cases, the number of searches run against the large database 112 of known faces (DKF). Instead, most searches may be run against a smaller set of faces, such as the HPG 110, and then running once using a collection of images from the HPG 110 against the DKF 112. Moreover, a face-network, which may comprise multiple instances of part or all of the overall configuration, such as the edge devices 102, disclosed in FIG. 1 for example, will reduce the number of searches even more since faces that were not yet seen in one environment, or portion thereof, may already have been imported into the HPG 110 before their appearance in another environment, or portion thereof.

As another example, embodiments of the invention may provide for improved recognition performance, inasmuch as such embodiments may use relatively more images of the same person to recognize the identity of that person. That is, it may be relatively easier to identify the person in the same video or videos captured on multiple occasions that are close in time to each other, than to match the face to a set of images captured a long time ago. For example, collecting several images of the same face, especially from different angles, enables better and faster recognition of that face. The use of multiple video streams, such as from multiple respective edge devices 102, may provide these different angles and perspectives on one or more faces.

D. Example Methods

As disclosed herein, embodiments of the invention may employ a forecasting process to augment an HPG with faces that are predicted to appear at a particular place and/or time. The HPG may be created and maintained generally as outlined below in the discussion of FIG. 3.

In general, a face tracking process 300 may be implemented over a period of time. The face tracking process may begin and/or end when a particular face has not been detected, for example, for a certain period of time. As well, multiple faces may be tracked at any one time.

The face tracking process, which may be performed on a video frame by video frame basis, may involve receiving one or more video streams 302 and examining a region of interest in a video frame of the video stream, and identifying 304 a facial image in the video frame. The video streams may be received 302 from respective sources, such as edge devices for example. Some of the video streams may comprise video taken from different perspectives at the same general location. The video streams may be broken into respective sets of video frames.

The facial image of the video frame may then be compared 306 to facial images from one or more additional video frames which may closely follow, in time, the video frame of interest. If the similarity between the facial image of the video frame and the facial images in subsequent video frame(s) is sufficiently high, then the facial images are all assumed to be of the same face if the time difference between the video frames that are being compared is small enough. Tracking may stop, for example, when a particular face has not appeared at a particular time, and/or in a particular place, for a set period of time.

In more detail, and as part of the comparison process 306, a face detection and tracking module may check to see if the facial image in the video frame being examined is already being tracked. That is, the face detection and tracking module may look for a relatively high correlation between the facial image in the video image region of interest and the facial images in earlier video images. This correlation inquiry could be based on time and/or location of the facial image in the current video image and the facial images in the earlier video images.

If it is determined 308 that there is a high correlation, then it can be assumed that the face corresponding to the facial image in the current video image is already being tracked. In this case, the facial image in the current video image may then be assigned 310 to the face being tracked.

On the other hand, if it is determined 308 that the face is not currently being tracked when the video image comes in, the facial image in the video frame may be checked 312 against the faces in the HPG. If it is determined 314 that the facial image in the video frame is close enough to a face in the HPG, then that facial image may be assigned 316 to that face in the HPG. Because the facial image is new, either in the sense that it has either appeared for the first time or reappeared after the passage of a certain amount of time, tracking 316 of the face may begin.

If it is determined 314 that the facial image in the video frame is not close to any face in the HPG, then 318 a new face id may be generated, and tracking of the new face may begin. As well, the new face may be added to the HPG.

As further shown in FIG. 3 and discussed in further detail in connection with FIG. 4, a forecast 320 may be generated. In general, the forecast 320 may involve identifying, from historical facial images in video frames, one or more individuals whose probability of appearing at a particular place and time exceeds some threshold. The faces of these individuals may then be used to update 318 the HPG. By thus augmenting the HPG 318, the need to compare the predicted faces, when they actually appear in the future, to the DKF may be reduced, or avoided altogether. By reducing the number of such comparisons performed, embodiments of the invention may operate relatively faster than would be the case if the system (i) waited until a face was actually detected, and then (ii) compared the detected face to the DKF.

Figure 3:
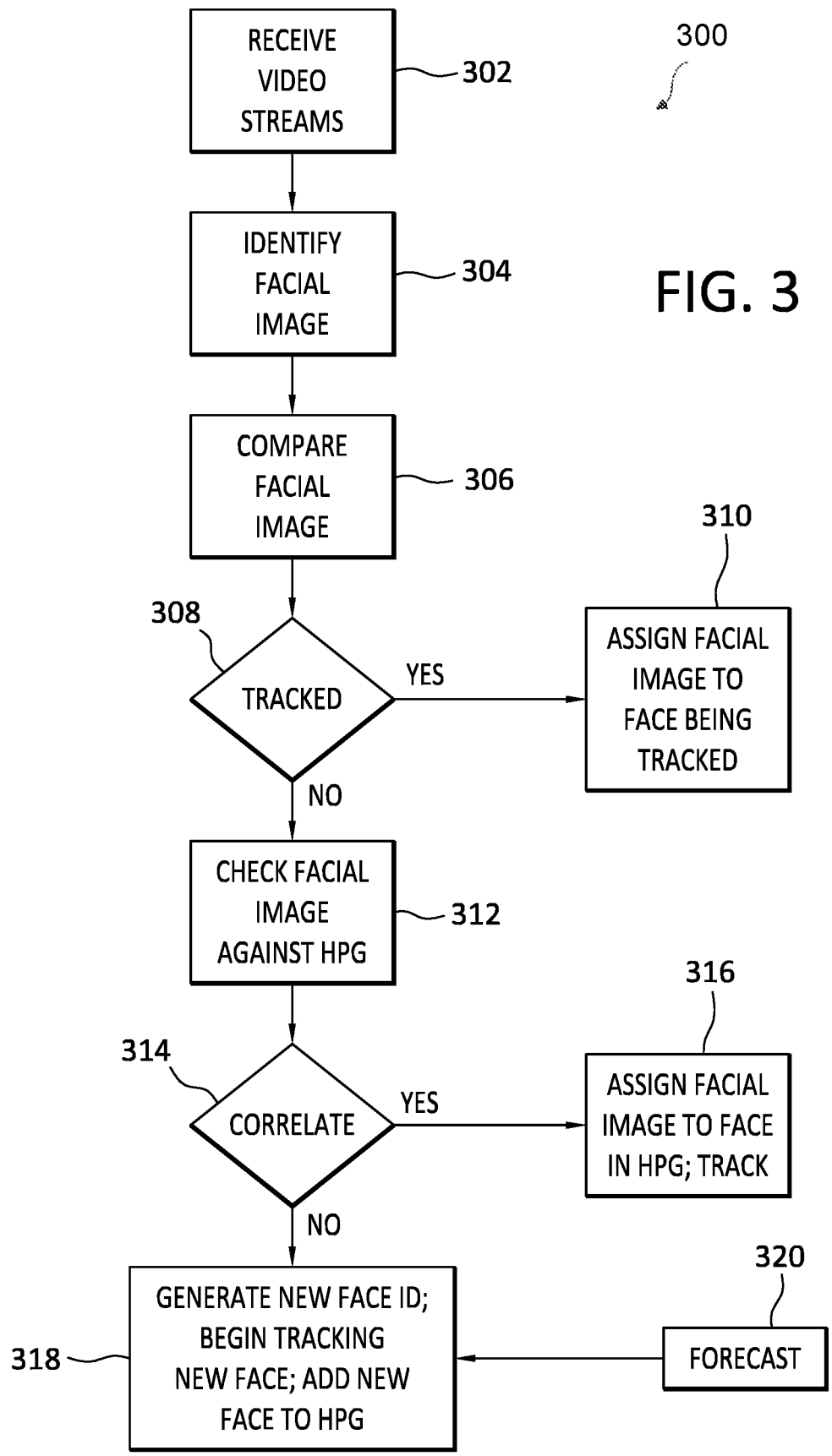
FIG. 3 discloses aspects of an example HPG update and forecasting method.

In general, and with particular reference to part 318 of the process of FIG. 3, multiple facial images may be collected of the face associated with person whose face id has been added 318 to the HPG. When enough of these facial images have been collected, an attempt may be made to match the face in the HPG to a face in the DKF. If a match is found, then information concerning that person may be obtained from the DKF.

Figure 4:
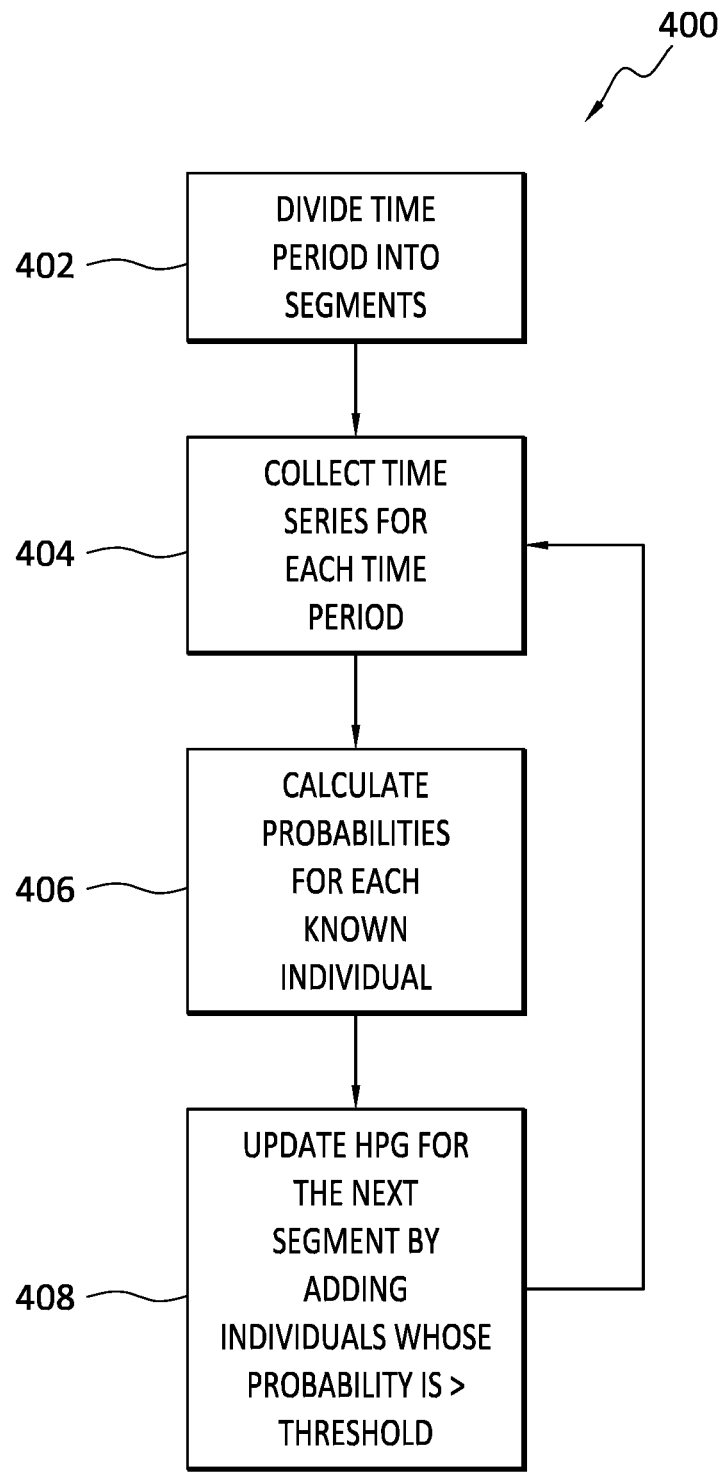
FIG. 4 discloses aspects of an example forecasting method.

Turning now to FIG. 4, and with continued reference to FIG. 3, details are provided concerning forecasting methods that may be employed in connection with processes such as those disclosed in FIG. 3. One example of a forecasting method is denoted generally at 400 in FIG. 4. The method 400 may be performed on ongoing basis, or at particular dates and times, such as may be specified in a schedule for example. The method 400 may run concurrently with part, or all, of the example method 300, although that is not required.

Generally, in the performance of method 400, a new time series may be collected each day, or other time period such as week, month, or hour for example, and probabilities may be calculated for each known individual for one or more of the time period(s). In real time, before the segment changes, for example moving from morning to noon, or between other times, the HPG may be updated for the next day, or other segment, by adding to the HPG all the individuals whose probability of appearance during the upcoming time segment of interest is determined to be higher than some established threshold. In this way, the probability of appearance of a person, such as in the next segment or any other subsequent segment, is forecast, and the HPG updated, notwithstanding that the person may not yet have actually appeared in the segment(s) of interest. That is, the forecast process, and corresponding update to the HPG, may anticipate the appearance of a person at a particular place and time in one or more future segments.

For example, the history of the appearances of a person for a Saturday, or group of Saturdays, may be used as a basis to predict that the person will appear at a particular place and/or time on any one or more Saturdays subsequent to the most recent Saturday. Note that the history of the appearances of a person may be determined, for example, by examining the HPG to identify the respective timestamps associated with the various facial images that have previously been recorded of that person. Additionally, or alternatively, the history of the appearances of a person for a Saturday, or group of Saturdays, may be used as a basis to predict that the person will appear at a particular place and/or time on one or more days, subsequent to the most recent Saturday, other than a subsequent Saturday. Finally, a forecast as to the likelihood that a person will appear in a given place at a given time may be based on as few as one prior appearance by that person, or may be based on any other number of prior appearances by that person. In some cases, the forecast may be based on a selected number of prior appearances, such as the last 5 appearances for example, and/or the forecast may be based on all prior appearances that took place less than, for example, 6 months ago. As these examples indicate, a forecaster has wide latitude in terms of the parameters that may be specified, and adjusted, for use by a forecast algorithm.

In more detail, embodiments of the invention may use the HPG to consistently learn, or unlearn, so as to improve the accuracy and reliability of the data in the HPG. Thus, for example, each face in the HPG may have one or more associated timestamps, which may be assigned by an edge device, that each correspond to a particular date and time that the face appeared in a video frame. These timestamps may be used to learn, and revise, the probabilities, for example, that one or more specific individuals will appear at a particular time, in a particular location, on a particular day or other time period.

With particular reference now to FIG. 4, the method 400 may begin when a particular time period, such as a day for example, is divided 402 into a number of segments. Time series information may then be collected 404 for the particular time period. Using the time series information, probabilities for each known individual may be calculated 406, such as by way of the algorithms and time series processes disclosed herein. As shown in the disclosed example algorithm, one or more of the calculated probabilities may be based in whole, or in part, on historical information concerning past appearances by the individual at a particular time and/or location.

Each of the probabilities may then be compared to a particular threshold, and any individuals, that is, faces, whose corresponding probability of appearance meets or exceeds an established threshold may then be added to the HPG, thereby updating the HPG 408 for the next segment of the time period. As indicated in FIG. 4, the method 400 may return to 404 for another iteration.

Advantageously then, embodiments of the invention may provide for, and/or improve, scalability of face recognition in environments where multiple video streams are employed. For example, the majority of facial image comparisons may be performed against the HPG, rather than against the larger DKF, so that faces may be matched relatively more quickly than would be the case if the comparisons were run against the HPG. Further, the faces in the HPG may be recognized with a relatively higher level of confidence, since multiple facial images, obtained from different respective angles and perspectives, may be associated with a given face.

E. Further Example Embodiments

Following are some further example embodiments of the invention. These are presented only by way of example and are not intended to limit the scope of the invention in any way.

Embodiment 1. A method, comprising: accessing an appearance history of a person, the appearance history including information concerning an appearance of a person at a particular time; generating, based on the appearance history, a forecast that comprises a probability that the person will appear again at some future point in time; determining that the probability meets or exceeds a threshold; and updating a high probability group database to include a facial image of a face of the person.

Embodiment 2. The method as recited in embodiment 1, wherein the appearance history comprises one or more timestamped facial images of the person.

Embodiment 3. The method as recited in any of embodiments 1-2, further comprising collecting a plurality of video streams, and generating the appearance history of the person using information from the plurality of video streams.

Embodiment 4. The method as recited in any of embodiments 1-3, further comprising collecting a plurality of video streams, and the plurality of video streams comprises a plurality of facial images of the person, each of the facial images comprising a different respective perspective of the face of the person.

Embodiment 5. The method as recited in any of embodiments 1-4, further comprising capturing, from a plurality of different angles, a respective plurality of facial images of the person.

Embodiment 6. The method as recited in any of embodiments 1-5, wherein, at the time the forecast is generated, the person has not yet appeared at the future point in time.

Embodiment 7. The method as recited in any of embodiments 1-6, wherein updating of the high probability group database to include a facial image of a face of the person is performed before the future point in time that the person was forecast to appear.

Embodiment 8. The method as recited in any of embodiments 1-7, wherein all faces in the high probability group database collectively form a subset of faces included in a database of known faces.

Embodiment 9. The method as recited in any of embodiments 1-8, wherein the facial image added to the high probability group database is obtained from a video stream.

Embodiment 10. The method as recited in any of embodiments 1-9, wherein generating the forecast comprises: dividing a time period into segments; collecting time series information for the time period; calculating, using the time series information, a probability that the person will appear again at the future point in time, and the future point in time falls within one of the segments.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
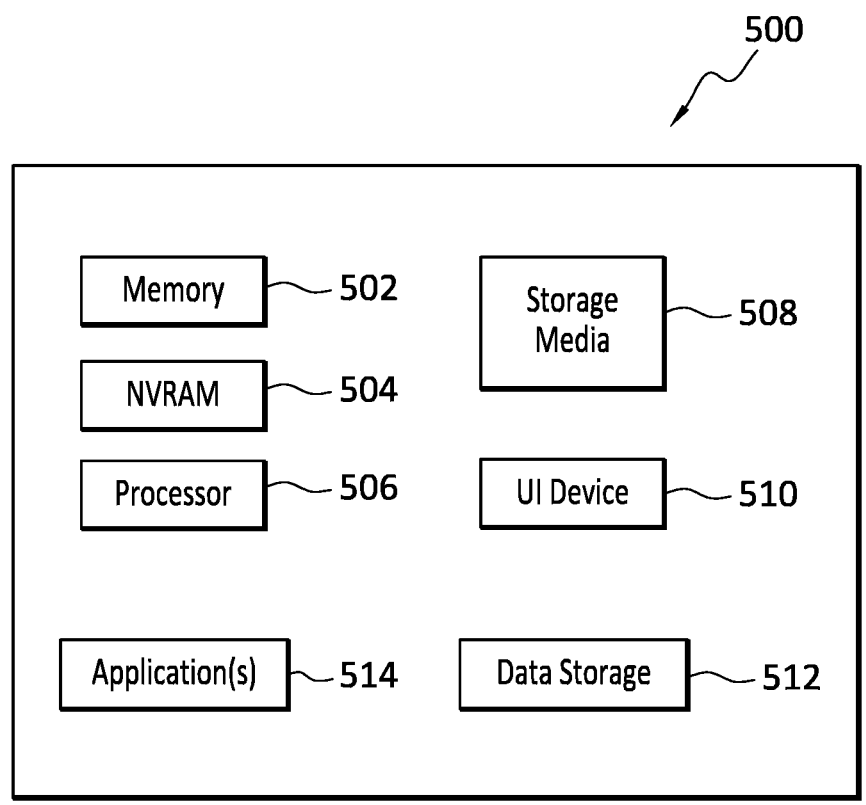
FIG. 5 discloses aspects of an example host computing device.

With reference briefly now to FIG. 5, any one or more of the entities disclosed, or implied, by FIGS. 1-4 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile random access memory (NVRAM) 504, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
accessing an appearance history of a person, the appearance history including information concerning an appearance of a person at a particular time;
dividing a time period into segments;
collecting time series information for the time period;
calculating, using the time series information, a probability that the person will appear again at another particular point in time, and the another particular point in time falls within one of the segments;
generating, based on the appearance history, and in real time, a forecast that comprises the probability that the person will physically appear again at the another particular time and particular location;
determining that the probability meets or exceeds a threshold; and
updating a high probability group database to include a facial image of a face of the person.

2. The method as recited in claim 1, wherein the appearance history comprises one or more timestamped facial images of the person.

3. The method as recited in claim 1, further comprising collecting a plurality of video streams, and generating the appearance history of the person using information from the plurality of video streams.

4. The method as recited in claim 1, further comprising collecting a plurality of video streams, and the plurality of video streams comprises a plurality of facial images of the person, each of the facial images comprising a different respective perspective of the face of the person.

5. The method as recited in claim 1, further comprising capturing, from a plurality of different angles, a respective plurality of facial images of the person.

6. The method as recited in claim 1, wherein, at the time the forecast is generated, the person has not yet appeared at the another particular time and particular location.

7. The method as recited in claim 1, wherein updating of the high probability group database to include a facial image of a face of the person is performed before the another particular point in time that the person was forecast to appear.

8. The method as recited in claim 1, wherein all faces in the high probability group database collectively form a subset of faces included in a database of known faces.

9. The method as recited in claim 1, wherein the facial image added to the high probability group database is obtained from a video stream.

10. A non-transitory storage medium having stored therein instructions that are executable by one or more hardware processors to perform operations comprising:
accessing an appearance history of a person, the appearance history including information concerning an appearance of a person at a particular time;
dividing a time period into segments;
collecting time series information for the time period;
calculating, using the time series information, a probability that the person will appear again at another particular point in time, and the another particular point in time falls within one of the segments;
generating, based on the appearance history, and in real time, a forecast that comprises the probability that the person will physically appear again at the another particular time and particular location;
determining that the probability meets or exceeds a threshold; and
updating a high probability group database to include a facial image of a face of the person.

11. The non-transitory storage medium as recited in claim 10, wherein the appearance history comprises one or more timestamped facial images of the person.

12. The non-transitory storage medium as recited in claim 10, wherein the operations further comprise collecting a plurality of video streams, and generating the appearance history of the person using information from the plurality of video streams.

13. The non-transitory storage medium as recited in claim 10, wherein the operations further comprise collecting a plurality of video streams, and the plurality of video streams comprises a plurality of facial images of the person, each of the facial images comprising a different respective perspective of the face of the person.

14. The non-transitory storage medium as recited in claim 10, wherein the operations further comprise capturing, from a plurality of different angles, a respective plurality of facial images of the person.

15. The non-transitory storage medium as recited in claim 10, wherein, at the time the forecast is generated, the person has not yet appeared at the another particular time and particular location.

16. The non-transitory storage medium as recited in claim 10, wherein updating of the high probability group database to include a facial image of a face of the person is performed before the another particular point in time that the person was forecast to appear.

17. The non-transitory storage medium as recited in claim 10, wherein all faces in the high probability group database collectively form a subset of faces included in a database of known faces.

18. The non-transitory storage medium as recited in claim 10, wherein the facial image added to the high probability group database is obtained from a video stream.

* * * * *